United States Patent [19]
Baney et al.

[11] Patent Number: 5,272,560
[45] Date of Patent: Dec. 21, 1993

[54] VARIABLE SPECTRAL WIDTH MULTIPLE PASS OPTICAL NOISE SOURCE

[75] Inventors: Douglas M. Baney, Menlo Park; Wayne V. Sorin, Mountain View, both of Calif.

[73] Assignee: Hewlett-Packard Company, Palo Alto, Calif.

[21] Appl. No.: 860,636

[22] Filed: Mar. 30, 1992

[51] Int. Cl.$^5$ .................... H01S 3/10; H01S 3/30; G02B 27/28
[52] U.S. Cl. .................... 359/249; 359/281; 359/337; 359/341; 359/484; 372/27; 372/29; 372/703
[58] Field of Search ............ 359/337, 339, 341, 349, 359/484, 495, 249, 281, 283; 372/27, 28, 700, 703, 26, 29, 32

[56] References Cited

U.S. PATENT DOCUMENTS

| | | | |
|---|---|---|---|
| 3,584,312 | 6/1971 | Statz | 359/339 |
| 3,666,349 | 5/1972 | Hubby, Jr. | 372/28 |
| 3,774,120 | 11/1973 | Ross | 372/28 |
| 3,918,007 | 11/1975 | Waksberg | 372/27 |
| 4,006,426 | 2/1977 | Lacour | 359/347 |
| 4,498,179 | 2/1985 | Wayne et al. | 372/27 |
| 4,656,433 | 4/1987 | Franklin et al. | 359/495 |
| 4,923,291 | 5/1990 | Edagawa et al. | 372/27 |
| 4,935,932 | 6/1990 | Johnson et al. | 372/27 |
| 4,952,017 | 8/1990 | Henry et al. | 359/344 |
| 4,955,725 | 9/1990 | Johnson et al. | 372/27 |
| 5,048,030 | 9/1991 | Hiiro | 359/495 |
| 5,052,004 | 9/1991 | Gratze et al. | 372/28 |
| 5,136,598 | 8/1992 | Weller et al. | 372/28 |
| 5,177,634 | 1/1993 | Way | 359/339 |

OTHER PUBLICATIONS

"High Power, Compact 1·48μm Diode-Pumped Broadband Superfluorescent Fibre Source At 1·55μm," by H. Fevrier et al., *Electronics Letters*, vol. 27, No. 3 pp. 261-262, Jan. 31, 1991.

"Multipass Amplifiers Using Optical Circulators," by J. Krasinski, D. F. H Heller and Y. B. Band, *IEEE Journal of Quantum Electronics*, vol. 26, No. 5, pp. 950-958, May 1990.

"Gain and Noise Characterisation of Erbium Doped Fibre Amplifiers," by G. R. Walker, *Electronics Letters*, vol. 27, No. 9, pp. 744-745, Apr. 25, 1991.

"Polarization noise suppression in retracing optical fiber circuits," by Natale C. Pistoni and Mario Martinelli, *Optics Letters*, vol. 16, No. 10, pp. 711-713, May 15, 1991.

"Birefringence Effects Suppression in Optical Fiber Sensor Circuits," by N. C. Pistoni and N. Martinelli, *CISE Tecnologie Innovative*, Milano, Italy, pp. 125-128.

"Polarisation-Insensitive Fibre Optic Michelson Interferometer," by A. Kersey et al., *Electronics Letters*, vol. 27, No. 6, pp. 518-520, Mar. 14, 1991.

*Primary Examiner*—Martin Lerner

[57] ABSTRACT

An apparatus for creating an optical noise of a predetermined bandwidth that uses an optical amplifier which amplifies optical noise components and produces unpolarized optical noise by spontaneous emission, a mirror to reflect the optical noise components back to the optical amplifier and a filter that filters out optical noise components outside the predetermined optical bandwidth. The filter is located so that optical noise components passed by the filter are amplified in the optical amplifier during an additional amplification. Optionally, a polarizer and Faraday rotator are used in the apparatus. The optical noise created in the optical amplifier is polarized in the polarizer after two amplifications, rotated in the Faraday rotator, then amplified two more times before leaving the apparatus.

12 Claims, 2 Drawing Sheets

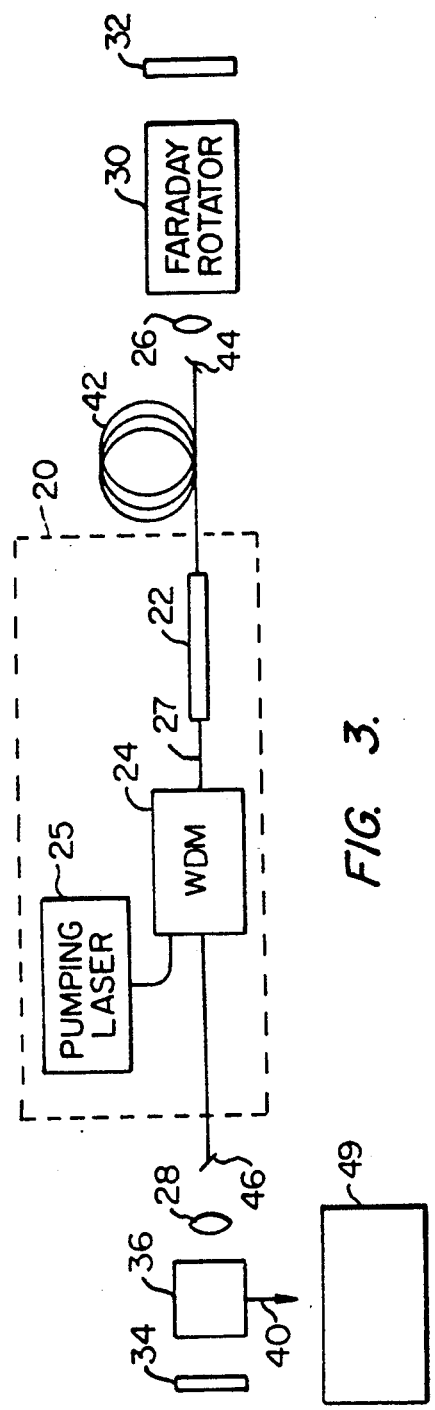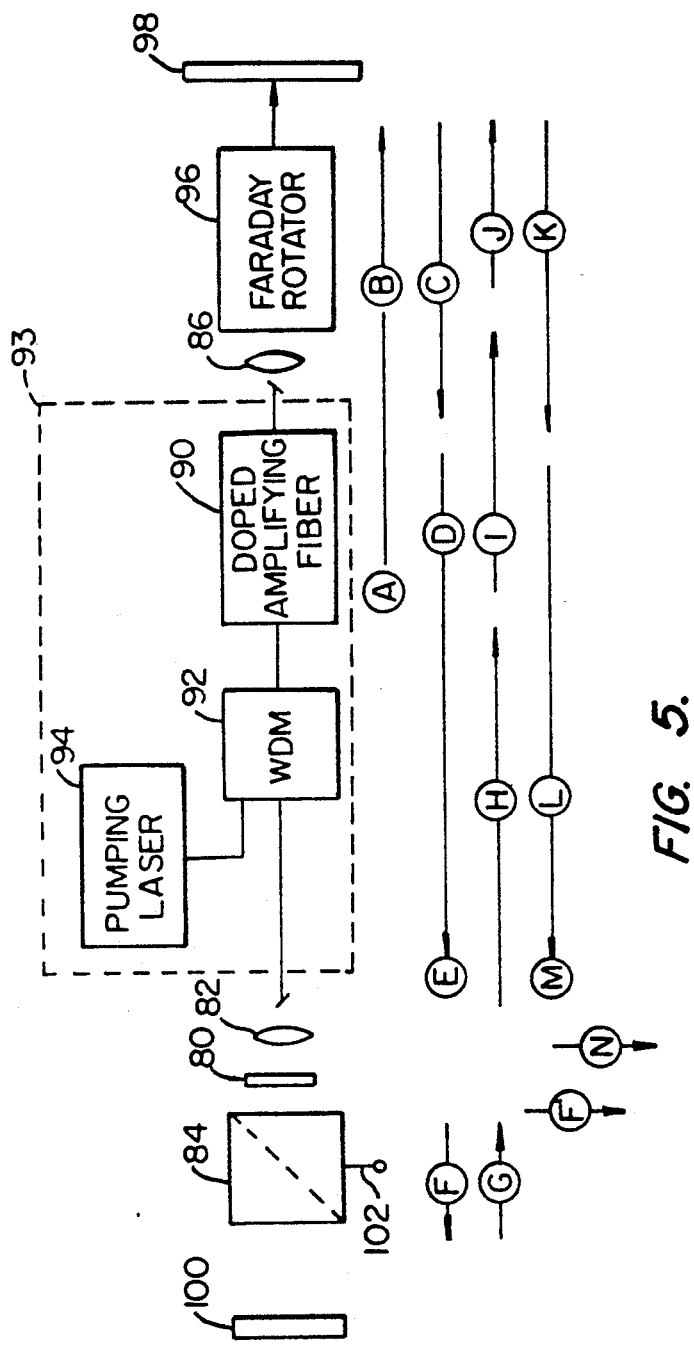

VARIABLE SPECTRAL WIDTH MULTIPLE PASS OPTICAL NOISE SOURCE

BACKGROUND OF THE INVENTION

This invention relates to a system and apparatus for generating an optical noise in a predetermined bandwidth. This optical noise can be used in many applications, such as photodetector calibration and white light spectroscopy. In photodetector calibration the optical noise output, which is relatively flat over a certain bandwidth, is sent to a photodetector. The photodetector's electrical response is then examined on a spectrum analyzer to find distortions which may be caused by the frequency response of the photodetector. In white light spectroscopy, the optical noise output is sent to the material being tested and the absorption spectrum is analyzed.

Prior art optical noise generators include two-pass noise generators which use amplified spontaneous emission (ASE). "High Power Compact 1·48 μm Diode pumped Broadband Superfluorescent Fibre Source at 1·58 μm"; H. Fevrier, et al.; *Electronic Letters*, Vol. 27, No. 3; Jan. 31, 1991; gives an example of such a noise generator. This article discloses the use of the optical amplifier in a two-pass noise generator as shown in FIG. 2. The optical amplifier 10 may consist of a doped amplifying fiber 16 used as the gain medium and a pumping laser 12 which sends optical energy to the doped amplifying fiber via a wavelength division multiplexer (WDM) 14.

Optical noise is spontaneously emitted in the doped amplifying fiber 16 powered by the pumping laser 12. In the system disclosed by Fevrier, optical noise created by spontaneous emission travels through the doped amplifying fiber and is amplified. The amplified optical noise components then go to a mirror 18 which reflects the amplified optical noise components back to the optical amplifier. The optical amplifier amplifies the optical noise components a second time, and then the twice-amplified optical noise components travel to the output.

The pumping frequency of the pumping laser 12 is chosen so that the frequency is absorbed by the doped amplifying fiber 16. The energy from the pumping laser 12 goes through the wavelength division multiplexer 14 to pump the doped amplifying fiber 16 to a higher energy state, so that the doped amplifying fiber 16 will amplify optical signals such as optical noise components coming in through the optical path, and so that the doped amplifying fiber 16 will spontaneously emit light energy.

Looking at FIG. 2, the wavelength division multiplexer 14 works by multiplexing the pumping frequency on line B onto line C, so that the doped amplifying fiber 16 can absorb the pumping frequency and amplify the optical signal on the path. Signals going into the wavelength division multiplexer (WDM) 14 from line C will be de-multiplexed into two signals: on line A, the signal which contains the optical noise components not within the pumping frequency; and on line B, the optical signals of the pumping frequency are sent back to the pumping laser.

Other similar prior art systems use a filter at the output of the noise generator so that the optical noise components will be within a desired predetermined bandwidth. Because the filter is placed at the output of the optical path, the optical amplifier amplifies optical noise components that are not within the predetermined bandwidth, during the second amplification of the optical noise components. This unnecessary amplification of optical noise components outside the predetermined bandwidth may cause the optical amplifier to saturate. If the amplifier saturates, the optical noise components within the predetermined bandwidth are not amplified as much as the components would be amplified if the optical amplifier were unsaturated. Additionally, amplifying the optical noise components outside the predetermined bandwidth expends pump power from the pumping laser 12.

It is therefore an object of the present invention to provide a noise source that efficiently uses pump power.

A further object of the invention is to have a noise source that concentrates the available noise power in a narrow optical bandwidth.

SUMMARY OF THE INVENTION

An advantage of the present invention is the placement of a filter so that the optical amplifier as a noise source does not amplify optical noise components outside the bandwidth of interest during at least one amplification. This placement of the filter may prevent the optical amplifier from becoming saturated by noise outside the filter bandwidth. In accordance with the principles of the present invention, the above and other objectives are realized by using an apparatus for creating an optical noise of a predetermined bandwidth. The apparatus includes an amplifying means in an optical path for amplifying optical noise components. This amplifying means produces unpolarized optical noise by spontaneous emission.

Furthermore, the apparatus includes a reflecting means in the optical path for reflecting the optical noise produced by the amplifying means back to the amplifying means for at least one additional amplification. The amplifying means also includes a filter means for filtering out the optical noise components outside the predetermined optical bandwidth and for passing optical noise components within the predetermined optical bandwidth. The filter means is located in the optical path so that optical noise components passed by the filter means are amplified by the amplifying means during an additional amplification.

Additionally, the above and other objectives are realized by using a method for creating optical noise of a predetermined bandwidth. The method comprises the steps of creating unpolarized optical noise by spontaneous emission, thereafter amplifying the optical noise in an amplifying means, reflecting the amplified optical noise components to travel towards the amplifying means, filtering out the optical noise components outside the predetermined bandwidth and passing optical noise components within the predetermined bandwidth, and thereafter amplifying the filtered optical noise components that are passed in the filtering step.

BRIEF DESCRIPTION OF THE DRAWINGS

The above and other features and aspects of the present invention will become more apparent upon reading the following detailed description in conjunction with the accompanying drawings, in which:

FIG. 3 shows the four-pass noise source of the present invention;

FIG. 5 is a schematic view of a four-pass noise source of the present invention where the paths of the optical noise components are shown below.

DETAILED DESCRIPTION OF THE PREFERRED EMBODIMENT

Figure 1:
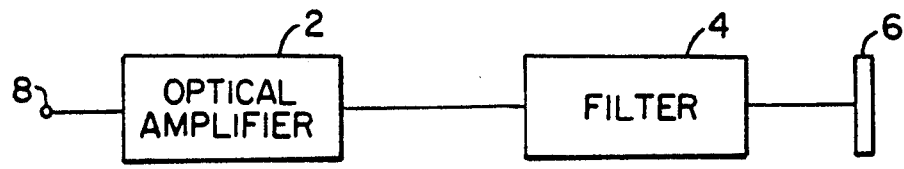
FIG. 1 is a schematic view of the optical noise source apparatus of the present invention.
Figure 2:
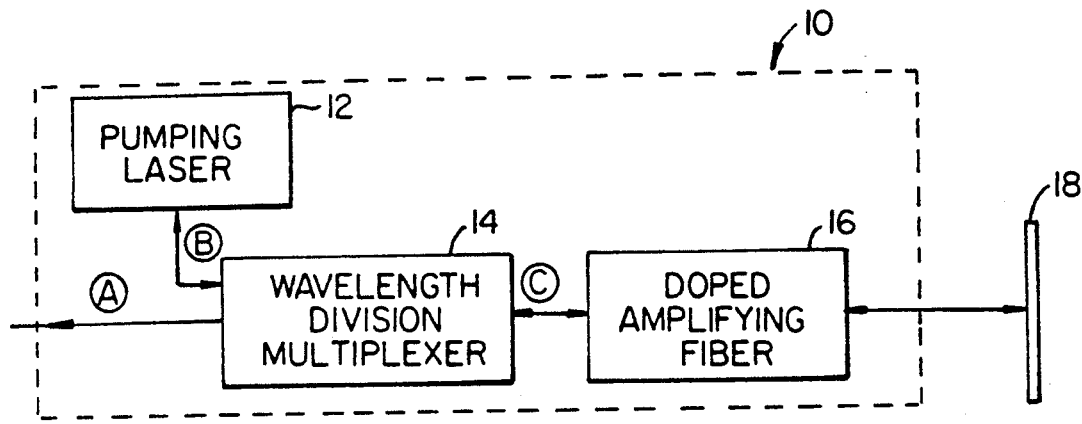
FIG. 2 is a schematic view of the prior art optical amplifier including a pumping laser, a wavelength division multiplexer, and a doped amplifying fiber.

FIG. 1 is a schematic view of the two-pass noise source of the present invention. An optical amplifier 2 such as the prior art optical amplifier shown in FIG. 2 is placed in the optical path. The components of the optical amplifier in the preferred embodiment include the pumping laser, WDM and doped amplifying fiber as described in the discussion of FIG. 3 below.

It is to be understood that other types of optical amplifiers could be used to create and amplify optical noise. For example, a co-propagating optical amplifier could be used. The optical amplifier shown in FIG. 2 is called a counter-propagating optical amplifier since the pumping signal from the pumping laser travels to the amplifying fiber in the opposite direction from the optical noise as it leaves the noise generator. A co-propagating optical amplifier would have the WDM and pumping laser located to the left of the doped amplifying fiber so that the pumping signal travels in the same direction as the optical noise as the optical noise leaves the noise generator.

The mirror 6 is used to reflect the optical noise back to the amplifier and can alternately be replaced by a Sagnac loop, which is a 3 dB coupler connected to a loop of fiber. In general, any means that causes the optical noise components to travel back to the amplifying means may be used as a reflective means and is within the scope of the invention. A filter 4 is also placed in the optical path. One embodiment uses a transmissive tunable filter which is tunable between 1515-1560 nm with a 1 nm to 5 nm bandwidth. The noise source with a tunable filter may operate as a tunable non-coherent optical source.

In the two-pass noise source of FIG. 1, unpolarized optical noise is created by spontaneous emission in the optical amplifier 2. More specifically, the spontaneous emission occurs in the doped amplifying fiber 16 of the prior art optical amplifier shown in FIG. 2. The unpolarized optical noise can either go towards the mirror 6 or towards the output 8. If the unpolarized optical noise goes towards the mirror 6, the optical noise is amplified in the optical amplifier a first time, and is filtered in the filter 4. The filter 4 filters the once-amplified optical noise components to within the predetermined bandwidth, and passes these filtered components to the mirror 6. The mirror 6 reflects the amplified optical noise components back through the filter towards the optical amplifier 2. Next, the amplified optical noise components are amplified a second time in the optical amplifier 2, and then sent to the output 8.

Since the optical noise components are filtered in the filter 4 before going into the optical amplifier 2 for an additional amplification, the optical amplifier 2 does not amplify for a second time the optical noise components that are not within the predetermined optical bandwidth.

At the output, these filtered twice-amplified optical noise components dominate over the once-amplified optical noise components created by spontaneous emission that go directly towards the output 8.

FIG. 3 shows a schematic view of a four-pass noise source of the present invention. This apparatus includes an optical amplifier 20 comprised of a doped amplifying fiber 22, such as Erbium doped fiber, a WDM 24 and a pumping laser 25. The pumping laser 25 can be a multimode or a single wavelength laser. In one embodiment of the present invention, the pumping laser 25 is a commercially available laser diode with a wavelength of 980 nm or 1480 nm. The wavelength division multiplexer (WDM) 24 used in the preferred embodiment is commercially available from Gould Electronics of Glen Burnie, Md. and such WDM's are often used in telecommunications applications. The preferred embodiment of the invention uses Erbium doped fiber as the amplifying fiber 22. Other doped amplifying fibers such as Praseodymium fiber, Neodymium fiber, Promethium fiber, and Ytterbium fiber can also be used.

Two lenses 26 and 28 are shown that collimate the optical components as they leave the optical fiber 27 out of the ends 46 and 44.

Also shown is a reflective filter 32. This reflective filter 32 acts as both the reflecting means to reflect the optical noise components back toward the amplifier, and a filtering means to filter out the optical noise components not within the predetermined optical bandwidth and pass optical noise components within the predetermined optical bandwidth. The optical noise components that are within the predetermined optical bandwidth are passed back towards the optical amplifier 20, and the optical noise components not within the predetermined bandwidth are no longer present in the optical path.

The optical path also includes a Faraday rotator 30. The Faraday rotator 30 rotates the polarization of the optical noise components that go through it. A Faraday rotator in the preferred embodiment rotates the polarization of the optical noise components by 45° for each pass. In the preferred embodiment, the Faraday rotator 30 consists of a piece of Faraday-active material of the dimensions 2 mm×2 mm×300 μm (not shown) placed in a one-half inch cavity within a permanent magnet. This Faraday-active material may be a piece of (HoTb-Bi)IG from Mitsubishi Gas Chemical Company Inc. of Tokyo, Japan, but other types of Faraday- active material may be used.

A reflective filter 34 and a polarizing beamsplitter 36 form a polarizing means. The polarizing beamsplitter 36 of the preferred invention is commercially available from the Melles Griot company of Los Angeles, Calif. and consists of a glass cube 20 mm×20 mm×20 mm made of two triangular sections connected together. The polarizing beamsplitter 36 splits the unpolarized optical noise components sent from the optical amplifier 20 into two different orthogonal polarizations. For example, in one embodiment TE polarized optical noise components are sent to the output 40, and TM polarized optical noise components pass through the polarizing beamsplitter 36 to the reflective filter 34. The optical noise components that are within the predetermined optical noise bandwidth are passed back from the reflective filter 34 through the polarizing beamsplitter 36 to the amplifier 20.

The preferred embodiment of the four-pass optical noise source includes a delay line 42. The two ends 44 and 46 of the optical fiber 27 that contains the optical amplifier and the delay line 42, would ideally cause no reflections of the optical components that leave ends 44 and 46. In a real apparatus, however, some of the optical noise components that exit the optical fiber 27 are reflected back. This reflection may cause ripples in the output signal.

The delay line 42 is made up of a single mode fiber and in the preferred embodiment is 500 m long. The delay line 42 can be used if there are ripples in the output signal coming from the output 40 of the noise source to the device 49 that uses the output signal. If the device 49 that uses the four-pass optical noise source has a detection bandwidth $\Delta \nu_{det}$ that is much greater than $1/\tau$, where $\tau$ is the length of the delay line 42, the ripples in the output can be averaged out. This is because the frequency of the ripples in the output signal is less than the minimal resolvable frequency of the device 49 that uses the output signal.

The action of the optical noise components in the four-pass optical noise source can be better explained using the schematic diagram of FIG. 5. FIG. 5 shows a four-pass noise source similar to that in FIG. 3. However, FIG. 5 uses a transmissive filter 80 located between the lens 82 and the polarizing beamsplitter 84. This transmissive filter 80 does not allow any optical noise components outside the predetermined optical bandwidth to pass from the amplifier to the polarizing beamsplitter 82. Placing the filter at this position has the benefit of filtering the optical noise components right before the signal is sent to the output. The transmissive filter 80 placed in this position will also filter the optical noise components before the optical noise components' third and fourth amplification.

The steps that the optical components take in the four-pass optical noise generator are shown in the arrows and letters at the bottom of FIG. 5.

In step A, an unpolarized optical noise is spontaneously emitted in the doped amplifying fiber 90 of the optical amplifier, which consists of the doped amplifying fiber 90, the wavelength division multiplexer or WDM 92, and the pumping laser 94. The spontaneously emitted optical noise leaving the doped amplifying fiber is unpolarized. This spontaneously emitted unpolarized optical noise can either go towards the Faraday rotator 96 and mirror 98 or go towards the polarizing beamsplitter 84.

If the unpolarized optical noise goes towards the Faraday rotator 96 and mirror 98, then in step B the optical noise components are amplified a first time, sent out the optical fiber to the lens 86, passed through the Faraday rotator 96 and rotated 45°. Since the optical noise components are unpolarized, the 45° optical rotation leaves once-amplified optical noise components unpolarized.

In step C, the unpolarized once-amplified optical noise components reflect off the mirror 98 back towards the amplifier. The once-amplified optical noise components, which are unpolarized, pass through the Faraday rotator and are rotated another 45°, but remain unpolarized, and go through the lens 86 back to the optical fiber, and to the doped amplifying fiber 90.

In step D, the optical noise components are amplified a second time to create twice-amplified optical noise components which are unpolarized. These components then pass through the wavelength division multiplexer 92 and most of the unpolarized twice-amplified noise components, including all of the twice-amplified optical noise components that are within the predetermined bandwidth, pass through the WDM 92 out of the optical fiber through the lens 82. This occurs because the WDM passes the relevant optical noise components through to the lens 82 and sends an optical bandwidth including the pumping frequency to the pumping laser. The optical bandwidth that is sent by the WDM 92 to the pumping laser 94 is not part of the predetermined optical bandwidth of the four-pass noise source.

In step E, the twice-amplified unpolarized optical noise components are filtered in the transmissive filter 80 so that only the optical noise components within the predetermined optical bandwidth pass through to the polarizing beamsplitter 84. The polarizing beamsplitter 84 polarizes the twice-amplified unpolarized optical noise components. The twice-amplified optical noise components of a first polarization leave the polarizing beamsplitter 82 out to the output 102 as shown in step F'. The twice-amplified optical noise components of a second polarization pass through the polarizing beamsplitter 84 to the mirror 100 in step F. In the preferred embodiment, the second polarization is orthogonal to the first polarization.

In step G, the twice-amplified optical noise components of the second polarization rebound back towards the amplifier.

In step H, these components are filtered again in filter 80, pass through the lens 82 back into the optical fiber, and pass through the wavelength division multiplexer 92 to the doped amplifying fiber 90. The WDM 92 multiplexes the components with the pumping frequency of the pumping laser 94. The pumping frequency is then absorbed by the doped amplifying fiber 90.

In step I, the signal is amplified a third time to create thrice-amplified optical noise components of the second polarization. These components leave the optical fiber through the lens 86 to the Faraday rotator 96.

In step J, the signal is rotated 45° in the Faraday rotator 96 from the second polarization to a third polarization to create thrice-amplified optical noise components of the third polarization. These components are sent to the mirror 98. In step K, the components are reflected back through the Faraday rotator 96, which rotates the thrice-amplified optical noise signal components by 45° from the third polarization to the first polarization, and then sends the components back through the lens 86 to the optical fiber.

In step L, the noise is amplified in the doped amplifying fiber 90, to create four-times-amplified optical noise components of the first polarization. This noise then goes through the wavelength division multiplexer 92 and passes out through the lens 82.

In step M, the components are filtered for a last time in the transmission filter 80. The four-times-amplified optical noise components of the first polarization pass through the polarizing beamsplitter 84 to the output 102.

The four-times-amplified optical noise components dominate over the other components such as the twice-amplified optical components which are output in step F'. Additionally, the optical noise components that go towards the mirror 100 in step A instead of towards the mirror 98 as shown in step B would be at most thrice-amplified. These components are only thrice amplified because these components go through the doped amplifying fiber 90, are polarized, reflect off the mirror 100, come through the fiber again to be amplified a second time, are rotated in the Faraday rotator 96 twice, amplified the third time, and then sent to the output 102 through the polarizing beamsplitter 84.

If no filtering was used, the power at the output port would be approximately (neglecting optical coupling loss):

$$P_{out} \approx n_{sp} G^4 h \nu \Delta \nu$$

where G is the single-pass optical gain typically around 25 dB, $n_{sp}$ is a term proportional to the level of inversion in the doped amplifying fiber, h is Planck's constant, $\nu$ is the center frequency, and $\Delta \nu$ is the optical bandwidth.

If filtering is used, then $\Delta \nu$ stands for the bandwidth of the filter. The use of the filter will prevent noise from outside the optical bandwidth from saturating the amplifier and therefore the gain within the bandwidth of the filter is increased. A 1 nm bandwidth is sufficient to test the frequency response of high speed photodiodes. With a 1 nm bandwidth filter it is estimated that the noise power will be of the order of 10 mW/1 nm.

The use of four-pass gain results in efficient use of the pump power because the optical noise components have four times the possibility to delete the upper energy state, thus causing increased pump absorption. Additionally, since the pump absorption is enhanced, shorter doped amplifying fiber lengths can be used, which reduces the cost of the doped amplifying fiber.

Figure 4:
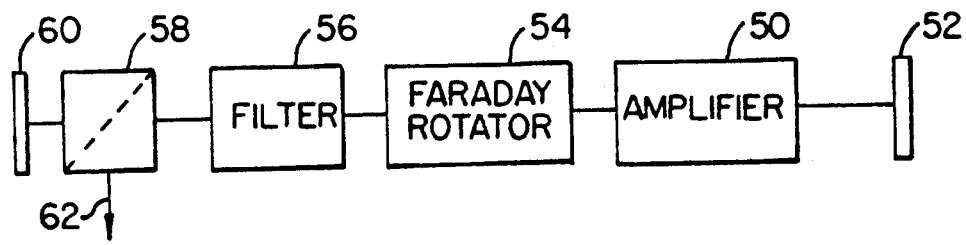
FIG. 4 shows a schematic view of an alternate four-pass noise source design of the present invention.

FIG. 4 is a schematic diagram of an alternate embodiment of a four-pass noise source. This alternate embodiment is most useful if the optical fiber does not display a birefringence effect. FIG. 4 shows the amplifier 50 which can be constructed out of the components shown in FIG. 2; a pumping laser 12, WDM 14 and doped amplifying fiber 16. An unpolarized optical signal is created by spontaneous emission in the amplifier 50. This signal moves to the mirror 52, which reflects it back to the amplifier 50 to create twice-amplified optical noise components which are unpolarized. These components are sent to the Faraday rotator 54, which then rotates the polarization of the signal. Since the signal is unpolarized, however, the components remain unpolarized after leaving the Faraday rotator 54. The components then go to the filter 56 which filters out the optical noise components that are outside of the predetermined optical bandwidth. The twice-amplified optical noise components which have been filtered are then sent to the polarizing beamsplitter 58, where the twice-amplified optical noise components are split into two different polarizations. The twice-amplified optical noise components of the first polarization are sent to the output 62. The twice-polarized optical noise components of the second polarization are sent to the mirror 60, which then reflects the component back through the polarizing beamsplitter to the filter 56 and to the Faraday rotator 54. The Faraday rotator rotates the polarization of this signal to create twice-amplified optical noise components of the third polarization.

In the preferred embodiment, a 45° rotation of the components' polarization is created in the Faraday rotator. The twice-amplified optical noise components of the third polarization are then amplified in the amplifier 50 to create thrice-amplified optical noise components of the third polarization. These components then go to the mirror 52, which reflects them back towards the amplifier 50. In the amplifier 50, thrice-amplified optical noise components of the third polarization are amplified to create four-times-amplified optical noise components of the third polarization. These components go through the Faraday rotator 54, which rotates them from the third polarization to the first polarization to create four-times-amplified optical noise components of the first polarization. The optical signal is filtered again to remove the optical noise components outside the predetermined optical bandwidth, and then sent to the polarizing beamsplitter 58, which then sends the four-times-amplified optical noise components of the first polarization to output 62. The filtered four-times-amplified optical noise components of the first polarization dominate the output.

If there is a birefringence effect in the optical fiber, then it is preferred to place the Faraday rotator next to the mirror or reflective filter. Looking at FIG. 5, the Faraday rotator 96 in the preferred implementation is placed next to the mirror 98. When a 45° Faraday rotator is placed next to the reflecting means, the Faraday rotator compensates for birefringence changes induced on optical signals in the optical fiber 27 shown in FIG. 3. Because of this compensation, an optical component that enters the optical fiber during step H will be orthogonally polarized to the optical component exiting the optical fiber during step L despite any birefringence effect in the optical fiber.

If the Faraday rotator was placed as in FIG. 4 on the other side of the amplifier 50 and optical fiber (not shown), then the birefringence effect in the optical fiber, especially the birefringence effect due to any delay line, would affect the polarization of the components sent to the polarizing beamsplitter 58.

The change in the polarization of the optical components due to the birefringence effect or the $\delta \Theta$ error in the Faraday rotator away from 45° needs to be small or lasing will occur in the apparatus.

Various details of the implementation and method are merely illustrative of the invention. It will be understood that various changes in such details may be within the scope of the invention, which is to be limited only by the appended claims.

What is claimed is:

1. An apparatus for creating optical noise of a predetermined bandwidth comprising:
   an amplifying means in an optical path for amplifying optical noise components, said amplifying means including means for producing unpolarized optical noise by spontaneous emission;
   reflecting means in the optical path for reflecting the optical noise produced by the amplifying means back to the amplifying means for at least one additional amplification, said reflecting means located at a first location in said optical path;
   filter means for filtering out optical noise components outside the predetermined optical bandwidth and for passing optical noise components within the predetermined optical bandwidth, wherein said filter means is located in said optical path so that optical noise components passed by the filter means are amplified by the amplifying means during an additional amplification; and
   polarization altering means in said optical path for altering the polarity of the optical noise to limit the number of passes of the optical noise through said amplifying means to a predetermined number.

2. The apparatus of claim 1, wherein said polarization altering means comprises:

a polarizing means located in said optical path on the opposite side of said amplifying means from said first location for polarizing the optical noise components after said components have been amplified a second time, wherein said polarizing means passes optical noise components of a first polarization to an output and reflects optical noise components of a second polarization toward the amplifying means for a third amplification; and a Faraday rotor in said optical path located between said amplifying means and said first location adapted to rotate the polarization of the thrice-amplified optical noise component of the second polarization to a third polarization so that the thrice-amplified optical noise component of the third polarization is reflected by the reflecting means back to the Faraday rotator, and said Faraday rotator adapted to rotate the thrice-amplified optical noise component of the third polarization to the first polarization, so that the amplifier amplifies the thrice-amplified optical noise component of the first polarization to four-times-amplified optical noise components of the first polarization and so that the polarizing means passes the four-times-amplified optical noise components of the first polarization to the output such that the four-times-amplified optical noise does not return to the amplifying means and the amplifying means does not lase.

3. The apparatus of claim 2, wherein the filter means is a transmissive filter located in the optical path between the amplifying means and polarizing means, and wherein said transmissive filter allows optical noise components within the predetermined bandwidth to pass, but blocks the optical noise components outside the predetermined optical bandwidth.

4. The apparatus of claim 2, wherein the polarizing means comprises a polarizing beamsplitter and a second reflecting means for reflecting optical noise components of a second polarization toward the amplifying means.

5. The apparatus of claim 2, wherein a delay line is located between the amplifying means and the Faraday rotator.

6. The apparatus of claim 2, wherein the amplifying means comprises a pumping laser, a wavelength division multiplexer and a doped amplifying fiber.

7. The apparatus of claim 1, wherein the reflecting means and the filter means comprise a reflective filter, wherein said reflective filter reflects optical noise within the predetermined bandwidth and does not reflect optical noise outside the predetermined bandwidth.

8. The apparatus of claim 1, wherein said reflecting means comprises a mirror.

9. The apparatus of claim 1, wherein said polarization altering means comprises:

a polarizing means located in said optical path on the opposite side of said amplifying means from said first location for polarizing the optical noise components after said components have been amplified a second time, wherein said polarizing means passes optical noise components of a first polarization to an output and reflects optical noise components of a second polarization toward the amplifying means for a third amplification; and a Faraday rotor in said optical path located between said polarizing means and said amplifying means for rotating the polarization of the optical noise, wherein the Faraday rotor rotates the polarization of the twice-amplified optical noise components of the second polarization to a third polarization before the amplifying means amplifies the twice-amplified optical noise components of the third polarization during the third amplification, the reflecting means reflects the thrice-amplified optical noise components of the third polarization back to the amplifying means and the amplifying means amplifies the thrice-amplified optical noise components of the third polarization to create four-times-amplified optical noise components of the third polarization, and wherein said Faraday optical rotator rotates the polarization of the four-times-amplified optical noise components from the third polarization to the first polarization so that the polarizing means passes the four-times-amplified optical noise components of the first polarization to the output such that the four-times-amplified optical noise does not return to the amplifying means and the amplifying means does not lase.

10. A method for creating optical noise of a predetermined bandwidth, said method comprising the steps of:
  (a) creating an unpolarized optical noise by spontaneous emission;
  (b) thereafter, amplifying the optical noise in an amplifying means;
  (c) reflecting the amplified optical noise components back towards the amplifying means;
  (d) filtering out the optical noise components outside the predetermined bandwidth and passing optical noise components within the predetermined bandwidth;
  (e) thereafter, amplifying the filtered optical noise components that are passed in step (d); and
  (f) altering the polarization of the filtered optical noise in a manner that the optical noise is amplified in said amplifying means less than a predetermined number of times before the optical noise is sent to an output.

11. The method of claim 10, with the additional steps of:

polarizing the optical noise components so that optical noise components of a first polarization are passed to an output and optical noise components of a second polarization are caused to travel towards the amplifying means wherein twice-amplified optical noise components of the second polarization are caused to return to the amplifying means;

amplifying the twice-amplified optical noise components of the second polarization to thrice-amplified optical components of the second polarization;

rotating the polarization of the thrice-amplified optical noise components of the second polarization to a third polarization;

reflecting the thrice-amplified optical noise components of the third polarization back toward the amplifying means;

wherein said altering step comprises rotating the thrice-amplified optical noise components of the third polarization to the first polarization;

amplifying the thrice-amplified optical noise components of the first polarization to four-times-amplified optical noise components of the first polarization; and passing the four-times-amplified optical noise components of the first polarization to the output such that the four-times-amplified optical noise components do not return to the amplifying means.

12. The method of claim 10, with the additional steps of:

polarizing the optical noise components so that optical noise components of a first polarization are passed to an output and optical noise components of a second polarization are caused to travel towards the amplifying means wherein twice-amplified optical noise components of the second polarization are caused to travel to the amplifying means;

rotating the polarization of the twice-amplified optical noise components of the second polarization to a third polarization;

amplifying the twice-amplified optical noise components of the third polarization to thrice-amplified optical components of the third polarization;

reflecting the thrice-amplified optical noise components of the third polarization back towards the amplifying means;

amplifying the thrice-amplified optical noise components of the third polarization to four-times-amplified optical noise components of the third polarization;

wherein said altering step comprises rotating the four-times-amplified optical noise components of the third polarization to the first polarization; and passing the four-times-amplified optical noise components of the first polarization to the output such that the four-times-amplified optical noise components do not return to the amplifying means.

* * * * *